United States Patent
Harris et al.

(10) Patent No.: US 8,273,799 B2
(45) Date of Patent: Sep. 25, 2012

(54) AMINATION OF VINYL AROMATIC POLYMERS WITH TERTIARY AMINES

(75) Inventors: William I. Harris, Midland, MI (US);
Dennis A. Keeley, Beaverton, MI (US);
Daryl J. Gisch, Midland, MI (US);
Marvin H. Tegen, Midland, MI (US);
James A. Jagodzinski, Midland, MI (US); David C. McDonald, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 439 days.

(21) Appl. No.: 12/634,708

(22) Filed: Dec. 10, 2009

(65) Prior Publication Data
US 2010/0210743 A1    Aug. 19, 2010

Related U.S. Application Data

(60) Provisional application No. 61/152,343, filed on Feb. 13, 2009.

(51) Int. Cl.
*B01J 41/12* (2006.01)
(52) U.S. Cl. ............................. 521/30; 521/27; 521/32
(58) Field of Classification Search .................. 521/30, 521/32, 27
See application file for complete search history.

(56) References Cited

U.S. PATENT DOCUMENTS

| | | | |
|---|---|---|---|
| 2,614,099 A | 10/1952 | Bauman et al. | |
| 3,317,313 A | 5/1967 | Buggs et al. | |
| 4,192,921 A | 3/1980 | Dales | |
| 4,246,386 A | 1/1981 | Howell et al. | |
| 4,256,840 A | 3/1981 | Meitzner et al. | |
| 4,283,499 A | 8/1981 | Howell | |
| 4,355,116 A * | 10/1982 | Lee et al. ..................... | 521/27 |
| 4,419,245 A | 12/1983 | Barrett et al. | |
| 4,444,961 A | 4/1984 | Timm | |
| 4,479,877 A | 10/1984 | Guter | |
| 4,564,644 A | 1/1986 | Harris | |
| 4,568,700 A | 2/1986 | Warshawsky et al. | |
| 4,582,859 A | 4/1986 | Lein, Jr. et al. | |

(Continued)

FOREIGN PATENT DOCUMENTS

EP    1479440    5/2004

(Continued)

OTHER PUBLICATIONS

Gisch, U.S. Appl. No. 12/701,644, filed Feb. 8, 2010.

(Continued)

*Primary Examiner* — Peter D. Mulcahy
*Assistant Examiner* — Henry Hu
(74) *Attorney, Agent, or Firm* — Edward W. Black

(57) ABSTRACT

The invention generally relates to amination reactions and amination reaction products, and particularly to methods for aminating vinyl aromatic polymers utilizing tertiary amines. In one embodiment, the invention includes conducting an amination reaction by combining a tertiary amine and a vinyl aromatic polymer comprising benzyl chloride groups to form a reaction mixture and maintaining the pH of the reaction mixture within a designated range. In another embodiment, the invention includes an aminated vinyl aromatic polymer. In yet another embodiment, the invention includes an ion exchange resin including quaternary ammonium functionality. The invention is useful in preparing ion exchange resins suitable for a variety of applications such as the removal of perchlorate ions from water sources and recovery of gold cyanide from mining leach solutions.

12 Claims, 2 Drawing Sheets

U.S. PATENT DOCUMENTS

| | | | |
|---|---|---|---|
| 4,623,706 | A | 11/1986 | Timm et al. |
| 4,666,673 | A | 5/1987 | Timm |
| 4,944,878 | A | 7/1990 | Lockridge |
| 5,134,169 | A | 7/1992 | Green |
| 5,141,965 | A | 8/1992 | Pike et al. |
| RE34,112 | E | 10/1992 | Ma |
| 5,231,115 | A | 7/1993 | Harris |
| 5,244,926 | A | 9/1993 | Harris et al. |
| 5,510,394 | A * | 4/1996 | Hodgdon .................. 521/27 |
| 5,834,524 | A | 11/1998 | Bloodworth et al. |
| 6,059,975 | A * | 5/2000 | Alexandratos et al. ....... 210/683 |
| 6,251,996 | B1 | 6/2001 | Stahlbush |
| 6,448,299 | B1 | 9/2002 | Brown et al. |
| 6,756,462 | B2 | 6/2004 | Pafford et al. |
| 6,924,317 | B2 | 8/2005 | Feistel |
| 7,282,153 | B2 | 10/2007 | Barrett et al. |
| 2002/0042450 | A1 | 4/2002 | Lailach et al. |
| 2003/0018091 | A1 | 1/2003 | Pafford et al. |
| 2003/0019091 | A1 | 1/2003 | Wunderlich |
| 2004/0256597 | A1 | 12/2004 | Barrett et al. |
| 2006/0264521 | A1 | 11/2006 | Podszun et al. |
| 2008/0028949 | A1 | 2/2008 | Schallig et al. |
| 2008/0237133 | A1 | 10/2008 | Dale et al. |
| 2008/0289949 | A1 | 11/2008 | Harris et al. |

FOREIGN PATENT DOCUMENTS

| | | |
|---|---|---|
| EP | 0098130 | 12/2009 |
| WO | 2008144115 | 11/2008 |

OTHER PUBLICATIONS

Gisch, et al., U.S. Appl. No. 12/634,709, filed Dec. 10, 2009.

Sengupla, Arup K., I"on Exchange Technology, Advance in Pollution Control", (3) 115-147.

Greig, J. A., "Ion Exchange Developments and Applications", Proceedings of IEX '1996, 182, 388-395.

Greig, J. A., "Ion Exchange at the Millennuim", Imperial College Press, Jul. 2000, pp. 77-84.

Gode, et al., "Removal of Cr (VI) from Aqueous Solution by Two Lewatit-anion Exchange Resins", Journal of Hazardous Material B119, (2005) 175-182.

Narin, et al., "A Novel Solid Phase Extraction Procedure on Amberlite XAD-1180 for Speciation of CR (III), CR (VI) and Total Chromium in Environmental and Pharmaceutical Samples", Journal of Hazardous Materials, 150 (2008) 453-458.

Pehlvan, et al., "Sorption of CR(VI) Ions on Two Lewatit-anion Exchange Resins and Their Quantitative Determination Using UV-visible Spectophotometer", Journal of Hazardous Materials (2008).

Dabrowski, et al, "Selective Removal of the Heavy Metal Ions from Waters and Industrial Wastewaters by Ion-exchange Method", Chemosphere 56 (2004) 91-106.

"DOWEX Resins for Separation of Chromium Ions From Water", Dow Water Solutions, The Dow Chemical Company, (1995-2008).

PUROLITE Product Data Sheet.

PUROLITE perchlorate removal; product brochure.

Rohm & Haas Amberlite PWA2 Produce Brochure.

Calgon Carbon Resins for perchlorate removal; product brochure.

IP.com (IPCOM000157643D) An improved Strong Base Anion Resin for Both the More Selective Uptake and Regeneration of Perchlorate (pub.Aug. 29, 2007).

Gu, Brown, et al. "Regeneration of Perchlorate . . . " Environ Sci Technology, 2001, 35, pp. 3363-3368.

Gu, Brown, et al. "Sorption and Desorption of Perchlorate and U(VI) by Strong-Base Anion Exchange Reins" Environ. Sci. Technology, 2005,39, p. 901.

Gu, Brown, et al., "Selective Anion Exchange Resins for the Removal of Perchlorate from Groundwater" Envinronmental Sciences Division Publication No. 4863, published Feb. 1999.

Boodoo, "POU/POE Removal of Perchlorate" Water Conditioning & Purification, Aug. 2003.

Chapters 11, 12, 15 and 16 of "Perchlorate in the Environment" ed. Urbanski, Kluwer Academic/Plenum Publishers, NY 2000.

DOWEX Resins for Perchlorate, Dow Water & Process Solutions.

DOWEX1, High Capacity Strong Base Anion Exchange Resin for Regenerable and Non-Regenerable Applications.

DOWEX NSR-1, "A strong base, Nitrate Selective, Anion Exchange Resin."

DOWEX PSR-2, "A strong base anion exchange resin designed for the selective removal of trace contaminants from potable water."

DOWEX PSR-3, "A strong base anion exchange resin designed for the selective removal of trace contaminants from potable water."

Mosier-Boss, "Use of Raman Spec. to Evaluate the Selectivity of Bifunctional Anion Exchange Resins for Perchlorate" Abstract only, published Feb. 2008.

Suresh Subramonian, Anion-exchange resins from vinylbenzyl chloride: control of hydrolysis during polymerization, Reactive & Functional Polymers 29 (1996) 129-133.

Vaidya, S.V., et al., "Weak Base Anion Exchange Resin: Simplification of Amination Process and Control on SDC", Ion Exchange Advances, Proceedings of IEX 92, p. 112-119.

Ichiro Noda,et al., (1963), 66(6), 857-60 "Amination of Chloromethylation polystyrene", J. Chem Soc. Japan, (1963), vol. 66, No. 6 pp. 857-860.

Jones, Griffin D., Chloromethylation of Polystyrene, Industrial and Engineering Chemistry, vol. 44, No. 11, pp. 2686-2693.

Stephenson, Richard M. Journal of Chemical Engineering Data, 1993, 38 (4), 625-629.

F. Helfferich, Ion Exchange (McGraw-Hill 1962), p. 35-36.

Gisch, et al., U.S. Appl. No. 12/634,708, filed Dec. 10, 2009.

* cited by examiner

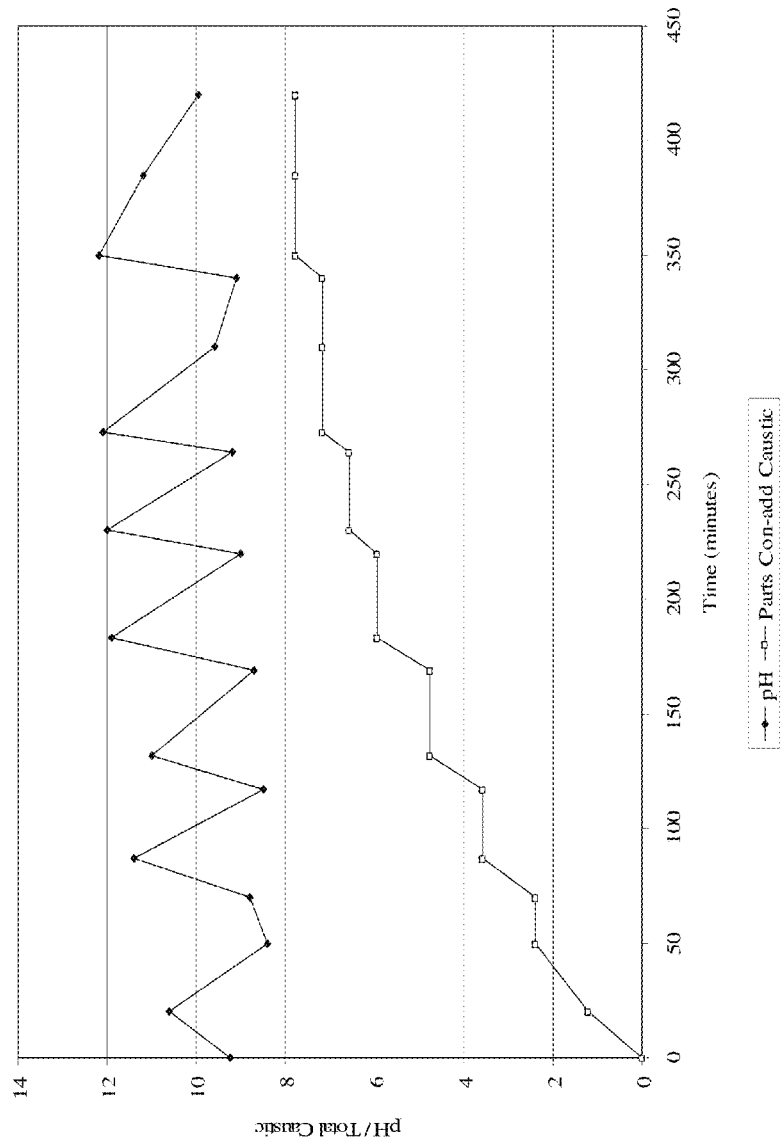
Figure 1: Graph showing pH and Total Caustic added to the Reaction Mixture of Example 1 vs. Reaction Time Period

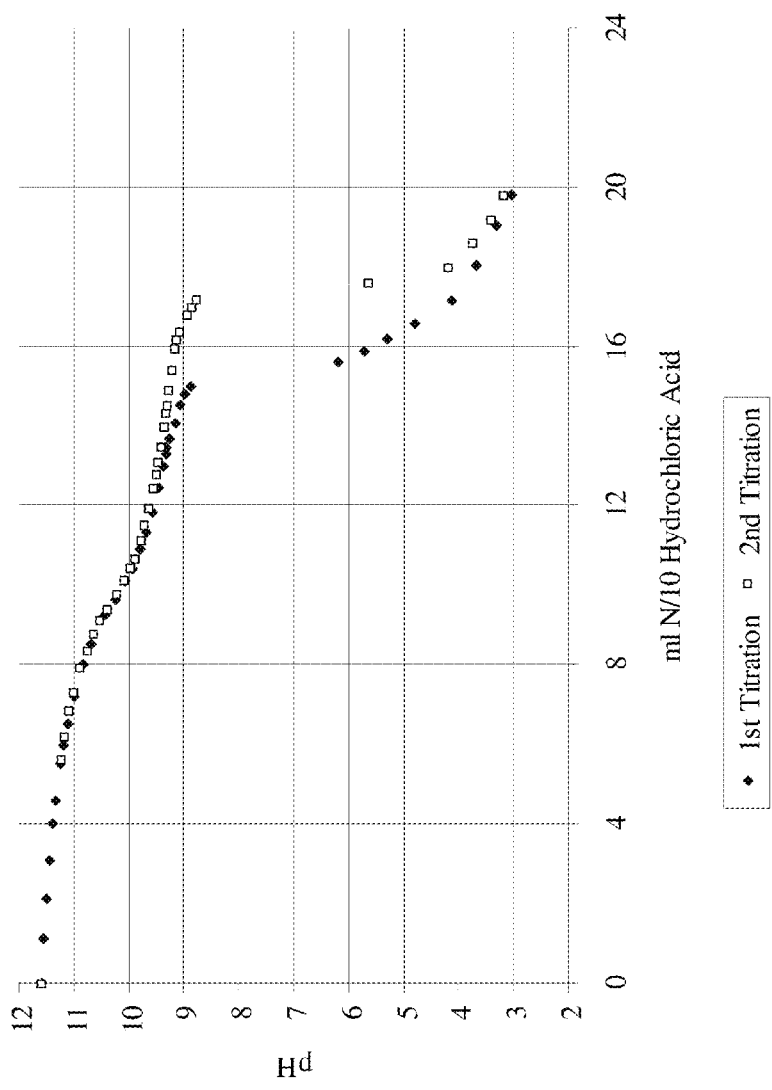
Figure 2: Graph showing titration curve of residual amination liquid from Example 2 (pH vs. quantity of N/10 HCl)

AMINATION OF VINYL AROMATIC POLYMERS WITH TERTIARY AMINES

CROSS-REFERENCE STATEMENT

This application claims the benefit of U.S. Provisional Application No. 61/152,343, filed Feb. 13, 2009 which is incorporated herein by reference.

BACKGROUND OF THE INVENTION (1) Field of the Invention

The invention generally relates to amination reactions and reaction products, and particularly to methods for aminating vinyl aromatic polymers utilizing tertiary amines. Such methods and reaction products are useful for preparing ion exchange resins.

(2) Description of the Related Art

Vinyl aromatic polymers are commonly functionalized with amine groups by way of "amination reactions," i.e. wherein a polymer is reacted with an amine to form an aminated reaction product. A common example is the preparation of ion exchange resin wherein a chloromethylated vinyl aromatic polymer is reacted with an amine to form an ion exchange resin including functional amine groups. Examples of such amination reactions are provided in: U.S. Pat. No. 5,134,169; U.S. Pat. No. 6,756,462; U.S. Pat. No. 6,924,317; U.S. Pat. No. 7,282,153; and US 2004/0256597. Aminations may be performed using primary, secondary or tertiary amines, or combinations; see for example U.S. Pat. No. 5,141,965 which discloses a sequential amination of a chloromethylated crosslinked vinyl aromatic polymer with a primary or secondary amine followed by a subsequent amination with a tertiary amine, U.S. Pat. No. 3,317,313 which discloses a sequential amination including a first amination with a tertiary amine followed by an amination with a secondary amine, and U.S. Pat. No. 6,059,975 which discloses amination with a tertiary amine having relatively large ($\geq$C5) alkyl groups followed by a second amination with a tertiary amine having smaller alkyl groups. The entire subject matter of each of the US patents listed above are incorporated herein by reference.

Commercially available examples of vinyl aromatic polymers aminated with tertiary amines include: DOWEX™ 1 brand ion exchange resin, a strong base, gel-type resin comprising a crosslinked styrene-divinylbenzene copolymer matrix with quaternary ammonium functionality (i.e. functional groups produced via reaction between a chloromethylated styrene-divinylbenzene copolymer matrix and a trimethyl amine); DOWEX™ SAR brand ion exchange resin (produced via reaction between a chloromethylated styrene-divinylbenzene copolymer matrix and a dimethylethanol amine); DOWEX™ PSR-2 brand resin, a strong base, gel-type resin (produced via reaction between a chloromethylated styrene-divinylbenzene copolymer matrix and tri-n-butyl amine); and DOWEX™ PSR-3 brand resin is a strong base, macroporous resin (produced via reaction between a chloromethylated styrene-divinylbenzene copolymer matrix and tri-n-butyl amine).

Ion exchange resins produced by amination with tertiary amines often suffer from low conversion (i.e. lower yields of the desired aminated reaction product as compared with aminations with primary or secondary amines) and "bead" or polymer particle breakage. These problems are even more pronounce when aminating with "bulky" tertiary amines. That is, tertiary amines having 7 or more carbon atoms, but particularly 8 or more carbon atoms (e.g. tripropyl amine, tributyl amine, etc.) have significant steric hindrance (and poor water solubility) which slows reaction with available benzyl chloride groups of the vinyl aromatic polymer. While the use of relatively high stoichiometric ratios of amine (e.g. greater than 1.5 mole of amine per mole of benzyl chloride group) can improve conversion, the use of such high ratios of amine is expensive and results in the loss of amine, or requires the use of amine recovery techniques.

BRIEF SUMMARY OF THE INVENTION

The invention generally relates to amination reactions and amination reaction products, and particularly to methods for aminating vinyl aromatic polymers utilizing tertiary amines. In one embodiment, the invention includes conducting an amination reaction by combining a tertiary amine and a vinyl aromatic polymer comprising benzyl chloride groups to form a reaction mixture, and maintaining the pH of the reaction mixture within a designated range for a portion of the reaction time period. In another embodiment, the invention includes an aminated vinyl aromatic polymer. In yet another embodiment, the invention includes an ion exchange resin including quaternary ammonium functionality. Many additional embodiments are disclosed.

BRIEF DESCRIPTION OF THE DRAWINGS

FIG. 1 is a graph showing pH and total caustic added to the reaction mixture of Example 1 as a function of reaction time period.

FIG. 2 is a graph showing a titration curve of the residual amination liquid from Example 2.

DETAILED DESCRIPTION OF THE INVENTION

The present invention includes a method of conducting an amination reaction by combining a tertiary amine and a vinyl aromatic polymer comprising benzyl chloride groups. An embodiment of the amination reaction is represented below as Reaction 1.

Reaction 1: Amination of chloromethylated vinyl aromatic polymer with tertiary amine

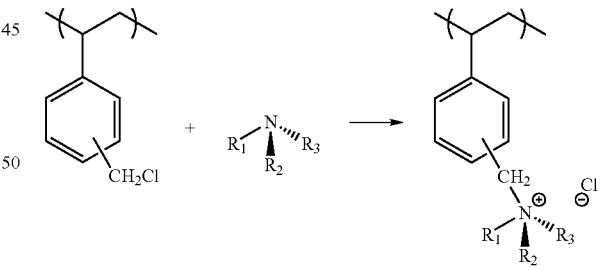

As described above, amination reactions of chloromethylated vinyl aromatic polymers (i.e. vinyl aromatic polymers containing benzyl chloride groups) with tertiary amines often result in relatively low conversion as compared with aminations using primary or secondary amines. And when used as ion exchange resins, the resulting polymer particles or "beads" are more prone to breakage. These problems are even more pronounced with tertiary amines include 7 or more carbon atoms, and particularly those including 8 are more carbon atoms, i.e. wherein $R_1$, $R_2$ and $R_3$ collectively comprise 8 or more carbons, (e.g. tripropyl amine, tributyl amine, etc.). While it had been understood that such "bulky" tertiary amines generally had slower reaction rates with benzyl chloride groups due to steric hindrance (and poor water solubility), longer reaction time periods and the use of higher stoichiometric quantities of amine have not adequately overcome these problems. While not wishing to be bound by theory, it is believed that the low conversions and bead breakage problems are attributed to undesired side reactions taking place during the amination reaction. Such aminations are typically conducted within a reaction mixture comprising an alcohol-based solvent such as methanol (along with water and optionally methylal or other combinations of solvents or swelling agents). During the amination reaction, the major side reactions have been identified and are represented below by Reactions 2, 3 and 4.

Reaction 2: Side reaction with alcohol (methanol)

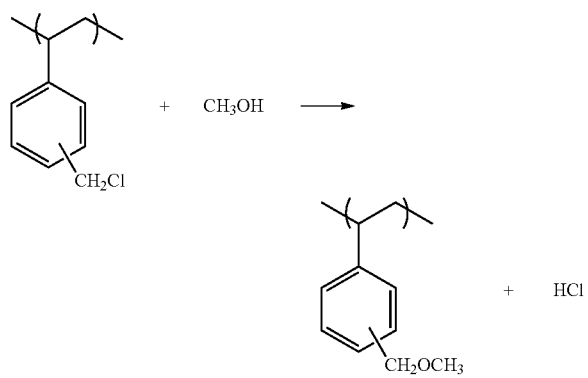

Reaction 3: Side reaction with water

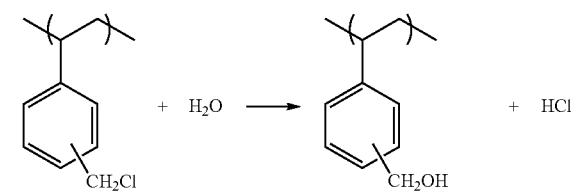

Reaction 4: Reaction between tertiary amine and HCl to produce "acid salt"

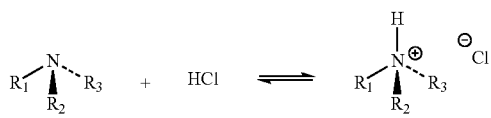

As shown by Reaction 2 and 3, undesired side reactions between the chloromethylated vinyl aromatic polymer and constituents of the alcohol-based solvent result in the production of hydrochloric acid, which in turn forms an acid salt with the amine (as shown in Reaction 4). The acid salt of the amine is effectively non-reactive with the benzyl chloride groups of the vinyl aromatic polymer, which partially explains the low yields of the desired aminated vinyl aromatic polymer represented in Reaction 1. Perhaps more significantly, the generation of HCl from Reactions 2 and 3 significantly lowers the pH of the reaction mixture such that the tertiary amine becomes less reactive with the benzyl chloride groups of the vinyl aromatic polymer. Furthermore, the side reaction represented by Reaction 2 becomes increasingly more favorable at lower pH values (e.g. below pH of 7). In the context of ion exchange resins which are provided in the form of a particle or "bead", the reaction product of Reaction 2 can disproportionately reside on the outer portion of the bead whereas the reaction product of Reaction 1 can disproportionately reside on the inner portion. During manufacture or use, the aminated portions of the polymer tend to swell much more than the alkoxy portions, resulting in bead breakage. By maintaining the reaction mixture within a specified pH range for a significant portion of the reaction time period, the undesired side reactions can be reduced, thus resulting in improved amination yields. As a consequence, in many embodiments of the invention lower stoichiometric ratios (e.g. less than 1.5 mole of tertiary amine per mole of benzyl chloride group of the vinyl aromatic polymer, and in several embodiments, less than 1.2, less than or equal to 1, and even less than or equal to 0.9 mole of amine per mole of benzyl chloride) to achieve commercially acceptable conversions (e.g. at least 40 percent of benzyl chloride converted into the aminated reaction product shown in Reaction 1; but preferably at least 50 percent and in some embodiments at least 60 percent).

The amination is conducted by combining a tertiary amine and a vinyl aromatic polymer comprising benzyl chloride groups within an alcohol-based solvent to form a reaction mixture. A preferred tertiary amine is represented by the Formula 1.

Formula 1:

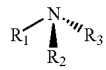

wherein $R_1$, $R_2$ and $R_3$ are each independently selected from: alkyl and alkoxy groups; with the proviso that the total number of carbon atoms for $R_1$, $R_2$ and $R_3$ is at least 7, but preferably at least 8, 9, 10, 11 and in some embodiments at least 12. In several embodiments, $R_1$, $R_2$ and $R_3$ are independently selected from alkyl or alkoxy groups comprising from 1 to 8 (preferably from 2 to 8) carbon atoms with the proviso that the total number of carbon atoms is at least 8. Each alkyl or alkoxy group ($R_1$, $R_2$ and $R_3$) may independently be: straight (e.g. ethyl, propyl, butyl, pentyl, etc.) or branched (e.g. isopropyl, isobutyl, etc.), and may be unsubstituted or substituted (e.g. substituted with such groups as a hydroxyl). In one series of embodiments, the three alkyl groups ($R_1$, $R_2$ and $R_3$) are independently selected from unsubstituted alkyl groups which may be straight or branched. In other embodiments, "mixed species" of the subject tertiary amines may be used, or the subject tertiary amines may be used in combination with amines falling outside the definition provided above, e.g. primary and secondary amines, or tertiary amines falling outside the scope of Formula 1. Specific examples of applicable amines include: tripropyl amine, tributyl amine, tripentyl amine, and trihexyl amine. A preferred amine is tri-n-butyl amine.

Suitable vinyl aromatic polymers are described in detail below; however, in a preferred embodiment the vinyl aromatic polymer is a gel-type polymer prepared by suspension polymerization of divinylbenzene, ethylvinylbenzene, and styrene (having a total styrenic content of greater than 75 molar percent), which has been reacted with a chloromethylated agent such as chloromethylmethylether. An example of a repeating unit of a vinyl aromatic polymer comprising benzyl chloride groups is represented by the Formula 2.

Formula 2: Repeating unit of vinyl aromatic polymer with benzyl chloride group

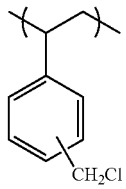

wherein the benzyl chloride group is located at the meta, ortho or para position.

The reaction mixture preferably comprises a tertiary amine and a vinyl aromatic polymer in a ratio of equal to or less than 1.5 mole of tertiary amine per mole of benzyl chloride group of the vinyl aromatic polymer; however in other embodiments the ratio of amine is less than or equal to: 1.3, 1.2, 1, or 0.9 mole per mole of benzyl chloride group. In other embodiments, the tertiary amine and vinyl aromatic polymer are combined in a ratio from 0.5 to 1.5 mole of tertiary amine per mole of benzyl chloride group, and in some embodiments from: 0.5 to 1.2, 0.5 to 1 or even 0.5 to 0.9 mole of tertiary amine per mole of benzyl chloride group of the vinyl aromatic polymer.

The alcohol-based solvent may comprise one or more alcohol solvents such as methanol, ethanol, propanol, isopropanol, butanol, iso-butanol and the like; however methanol is preferred. The alcohol-based solvent may further comprise additional solvents and/or swelling agents such as water, methylal, ethylene dichloride, diethyl ether, and optionally inorganic salts such as sodium chloride. In a preferred embodiment, the alcohol-based solvent comprises: methanol, methylal and water, and preferably at least 5, 20 and preferably 30 weight percent methanol, at least 5, 10 and preferably 20 weight percent methylal and at least 5 and preferably 10 weight percent water. In several embodiments, the alcohol-based solvent comprises from 35 to 60 weight percent methanol, 5 to 50 weight percent methylal and 1 to 20 weight percent water.

The reaction mixture comprising the tertiary amine, vinyl aromatic polymer comprising benzyl chloride groups, and alcohol-based solvent may be combined in a reaction vessel (preferably under agitation) for a reaction time period of at least 2 hours, preferably at least 4 hours, more preferably at least 6 hours, and in some embodiments at least 7 hours. The reaction time period defines the period of time in which the tertiary amine and vinyl aromatic polymer are in contact with each other under conditions such that Reaction 1 may occur. In some embodiments, the reaction time period is from 2 to 12 hours but preferably from 5 to 10 hours.

The reaction mixture is maintained at a temperature from 25 to 150° C., but preferably at least 50° C., more preferably at least 60° C. for at least half but preferably 90 percent of the reaction time period. In another embodiment, the reaction mixture is maintained at a temperature from 65 to 85° C., and preferably 70 to 80° C. for at least half the reaction time period. In another embodiment, the reaction mixture is maintained at a temperature of from 65 to 85° C. for at least 4 hours. While one or more of the constituents of the reaction mixture may be pre-heated prior to combination, the reaction mixture is typically combined at room temperature and subsequently heated.

In order to minimize side reactions, the pH of the reaction mixture is maintained at a pH of at least 7, preferably at least 8 and more preferably at least 8.5, for at least half but preferably at least 90 percent of the reaction time period. In several embodiments, the pH of the reaction mixture is maintained at values of between 7 to 12.5, preferably 8 to 12.2, and more preferably 8.5 to 11.5 for at least half the reaction time period but preferably for at least 90 percent of the reaction time period. The pH of the reaction mixture may be maintained within designated ranges by adding base to the reaction mixture. Side Reaction 2 becomes increasingly more favored at high pH values, i.e. above pH of about 12.5, and even 11.5. Thus, in several embodiments it is preferably to maintain the pH of the reaction mixture by adding multiple doses of base throughout the reaction time period, rather than a single dose which may raise the pH above the desired range. Alternatively, weak bases (e.g. sodium carbonate) or slightly soluble bases (e.g. calcium hydroxide) may added in sufficient quantities at the beginning of the amination to maintain the desired pH throughout the reaction without an undesired pH spike which can occur with a single large addition of a strong base such as sodium hydroxide (caustic). The pH of the reaction mixture is preferably maintained by optimizing such variables as base strength, base solubility, and timing of addition. The optional step of periodic or continuously monitoring the pH of the reaction mixture allows for more flexibility in base selection and dosing. The selection of base is not particularly limited. Examples of suitable bases include: sodium hydroxide, sodium carbonate, calcium hydroxide, calcium oxide and potassium hydroxide.

After the amination reaction, the resulting mixture may be cooled and the aminated vinyl aromatic polymer decanted, washed and optionally treated in dilute hydrochloric acid at elevated temperature (e.g. 50-90° C.).

As previously described, the type of vinyl aromatic polymers is not particularly limited. The term "polymer" is intended to include both homopolymers and copolymers (i.e. polymers derived from two or more different monomer species), but copolymers are preferred. A preferred class of polymers include vinyl aromatic polymers, sometimes also referred to in the art as "poly(vinylaromatic) polymers". For purposes of the present description, the term "vinyl aromatic polymers" refers to polymers derived from monovinylidene monomers and a crosslinking monomer. Such vinyl aromatic polymers may be prepared using well known polymerization techniques such as single-stage polymerization processes as described in F. Helfferich, Ion Exchange (McGraw-Hill 1962), pg 35-36, wherein a single monomer mixture is suspension polymerized to produce copolymer beads; or "seeded" or multi-staged polymerization processes such as described in U.S. Pat. Nos. 4,419,245 and 4,564,644.

Suitable monovinylidene monomers are well-known and reference is made to Polymer Processes, edited by Calvin E. Schildknecht, published in 1956 by Interscience Publishers, Inc., New York, Chapter III, "Polymerization in Suspension" at pp. 69-109. Table II (pp. 78-81) of Schildknecht describes many types of monovinylidene monomers which are suitable in practicing the present invention. Of the monomers listed, water-insoluble monovinylidene monomers including the monovinylidene aromatics such as styrene and substituted styrene are preferred. The term "substituted styrene" includes substituents of either/or both the vinylidene group and phenyl group of styrene and include: vinyl naphthalene, alpha alkyl substituted styrene (e.g., alpha methyl styrene) alkylene-substituted styrenes (particularly monoalkyl-substituted styrenes such as vinyltoluene and ethylvinylbenzene) and halo-substituted styrenes, such as bromo or chlorostyrene and vinylbenzylchloride. Other applicable monomers include monovinylidene non-styrenics such as: esters of α,β-ethylenically unsaturated carboxylic acids, particularly acrylic or methacrylic acid, methyl methacrylate, isobornylmethacrylate, ethylacrylate, and butadiene, ethylene, propylene, acrylonitrile, and vinyl chloride; and mixtures of one or more of said monomers. Preferred monovinylidene monomers include styrene and substituted styrene such as ethylvinylbenzene. The term "monovinylidene monomer" is intended to include homogeneous monomer mixtures and mixtures of different types of monomers, e.g. styrene and isobornylmethacrylate. Examples of suitable crosslinking monomers (i.e., polyvinylidene compounds) include polyvinylidene aromatics such as divinylbenzene, divinyltoluene, divinylxylene, divinylnaphthalene, trivinylbenzene, di(vinyl)(diphenyl)ether, di(vinyl)(diphenyl) sulfone, as well as diverse alkylene diacrylates and alkylene dimethacrylates. Preferred crosslinking monomers are divinylbenzene, trivinylbenzene, and ethylene glycol dimethacrylate. The terms "crosslinking agent," "crosslinker" and "crosslinking monomer" are used herein as synonyms and are intended to include both a single species of crosslinking agent along with combinations of different types of crosslinking agents.

The subject vinyl aromatic polymers are typically prepared from monomer mixtures comprising greater than 50 molar percent, and preferably greater than 75 molar percent of: styrene, substituted styrene or a combination thereof; with styrene and ethylvinylbenzene being preferred. Stated another way, the resulting vinyl aromatic polymer has a styrenic content greater than 50 molar percent, and more preferably greater than 75 molar percent (based upon the total molar content). The term "styrenic content" refers to the quantity of monovinylidene monomer units of styrene and/or substituted styrene utilized to form the polymer. The monomer mixture further includes a suitable amount of crosslinker monomer which is typically from 0.01 to 20 molar percent but preferably from 1 to 15 molar percent of the total monomer mixture.

Another class of applicable vinyl aromatic polymers are those including interpenetrating polymer networks (IPN). The term "interpenetrating polymer network" is intended to describe a material containing at least two polymers, each in network form wherein at least one of the polymers is synthesized and/or crosslinked in the presence of the other. The polymer networks are physically entangled with each other and in some embodiments may be also be covalently bonded. Characteristically, IPNs swell but do not dissolve in solvent nor flow when heated. Ion exchange resins including IPNs have been commercially available for many years and may be prepared by known techniques involving the preparation of multiple polymer components. Examples of such resins along with techniques for their preparation are provided in: U.S. Pat. No. 4,419,245; U.S. Pat. No. 4,564,644; U.S. Pat. No. 4,582,859; U.S. Pat. No. 5,834,524; U.S. Pat. No. 6,251,996; U.S. Pat. No. 6,924,317 and US 2002/0042450—all of which are incorporated herein in their entirety. As used herein, the term "polymer component" refers to the polymeric material resulting from a distinct polymerization step. For example, in a preferred embodiment of the present invention, the subject IPN ion exchange resins are "seeded" resins; that is, the resin is formed via a seeded process wherein a polymer (preferably crosslinked) seed is first formed and is subsequently imbibed with monomer and subsequently polymerized. Additional monomer may be subsequently added during the polymerization process (i.e. "continuous addition" or "con-add"). The formation of the seed particles constitutes a distinct polymer component. Similarly, the process step of imbibing and polymerizing a monomer mixture into the seed constitutes yet another polymer component. If used, the subsequent continuous addition of a monomer mixture commonly used to "grow up" the seed also constitutes a distinct polymer component. Except as specifically described herein, the constituents of each polymer component may be the same or different. Moreover, the monomer mixture used during a polymerization step need not be homogeneous; that is, the ratio and type of monomers may be varied. The term "polymer component" is not intended to mean that the resulting resin have any particular morphology other than an interpenetrating polymer network; however, the resins may have a "core-shell" type structure as is described in U.S. Pat. No. Re 34,112, the entire contents of which are incorporated herein by reference. Each polymer component of the present invention preferably contributes more than about 5 weight percent, and more preferably at least 10 weight percent of the final IPN polymer particle. Typically, the resins comprise two or three polymer components, e.g. a seed component, an imbibe component, and/or a continuous addition component. Those skilled in the art will appreciate that different or additional combinations of polymer components may be used, e.g., multiple con-add components may be utilized. The first, second, third, etc., polymer components do not necessarily correspond to an order of addition. That is, the "first polymer component" does not necessarily correspond to the polymer component which is first polymerized, e.g., a seed particle. The terms "first," "second," etc. are only used to distinguish one component from another, not to designate an order of addition.

As previously indicated, the polymers of the present invention may be made by way of a seeded polymerization. Seeded polymerizations, also known as continuous or semi-continuous staged polymerizations, are generally described in U.S. Pat. No. 4,419,245; U.S. Pat. No. 4,564,644; and U.S. Pat. No. 5,244,926—the entire contents of which are incorporated herein by reference. A seeded polymerization process typically adds monomers in two or more increments. Each increment is followed by complete or substantial polymerization of the monomers therein before adding a subsequent increment. A seeded polymerization is advantageously conducted as a suspension polymerization wherein monomers or mixtures of monomers and seed particles are dispersed and polymerized within a continuous suspending medium. In such a process, staged polymerization is readily accomplished by forming an initial suspension of monomers, wholly or partially polymerizing the monomers to form seed particles, and subsequently adding remaining monomers in one or more increments. Each increment may be added at once or continuously. Due to the insolubility of the monomers in the suspending medium and their solubility within the seed particles, the monomers are imbibed by the seed particles and polymerized therein. Multi-staged polymerization techniques can vary in the amount and type of monomers employed for each stage as well as the polymerizing conditions employed.

The seed particles employed may be prepared by known suspension polymerization techniques as previously described. The first monomer mixture comprises: 1) a first monovinylidene monomer, 2) a first crosslinking monomer, and 3) an effective amount of a first free-radical initiator. The suspending medium may contain one or more suspending agents commonly employed in the art. Polymerization is initiated by heating the suspension to a temperature of generally from about 50-90° C. The suspension is maintained at such temperature or optionally increased temperatures of about 90-150° C. until reaching a desired degree of conversion of monomer to polymer. Other suitable polymerization methods are described in U.S. Pat. No. 4,444,961; U.S. Pat. No. 4,623,706; U.S. Pat. No. 4,666,673; and U.S. Pat. No. 5,244,926—each of which is incorporated herein in its entirety.

Applicable monovinylidene monomers and crosslinking monomers include those previously described. The seed polymer component preferably comprises a styrenic content greater than 50 molar percent, and more preferably greater than 75 molar percent (based upon the total molar content). The term "styrenic content" refers to the quantity of monovinylidene monomer units of styrene and/or substituted styrene utilized to form the polymer. "Substituted styrene" includes substituents of either/or both the vinylidene group and phenyl group of styrene as described above. In one embodiment, the first monomer mixture used to form the first polymer component (e.g. seed) comprises at least 75 molar percent, and in some embodiments at least 85 molar percent of styrene.

The proportion of crosslinking monomer in the polymer seed particles is preferably sufficient to render the particles insoluble in subsequent polymerization steps (and also on conversion to an ion-exchange resin), yet still allow for adequate imbibition of an optional phase-separating diluent and monomers of the second monomer mixture. In some embodiments, no crosslinking monomer will be used. Generally, a suitable amount of crosslinking monomer in the seed particles is minor, i.e., desirably from about 0.01 to about 5 molar percent, preferably from about 0.1 to about 2.5 molar percent based on total moles of monomers in the first monomer mixture used to prepare the seed particles. In a preferred embodiment, the first polymer component (e.g. seed) is derived from polymerization of a first monomer mixture comprising at least 85 molar percent of styrene (or substituted styrene such as ethylvinylbenzene) and from 0.01 to about 5 molar percent of divinylbenzene.

Polymerization of the first monomer mixture may be conducted to a point short of substantially complete conversion of the monomers to polymer or alternatively, to substantially complete conversion. If incomplete conversion is desired, the resulting partially polymerized seed particles advantageously contain a free-radical source therein capable of initiating further polymerization in subsequent polymerization stages. The term "free-radical source" refers to the presence of free-radicals, a residual amount of free-radical initiator or both, which is capable of inducing further polymerization of ethylenically unsaturated monomers. In such an embodiment of the invention, it is preferable that from about 20 to about 95 weight percent of the first monomer mixture, based on weight of the monomers therein, be converted to polymer and more preferably from about 50 to about 90 weight percent. Due to the presence of the free radical source, the use of a free-radical initiator in a subsequent polymerization stage would be optional. For embodiments where conversion of the first monomer mixture is substantially complete, it may be necessary to use a free-radical initiator in subsequent polymerization stages.

The free-radical initiator may be any one or a combination of conventional initiators for generating free radicals in the polymerization of ethylenically unsaturated monomers. Representative initiators are UV radiation and chemical initiators, such as azo-compounds including azobisisobutyronitrile; and peroxygen compounds such as benzoyl peroxide, t-butylperoctoate, t-butylperbenzoate and isopropylpercarbonate. Other suitable initiators are mentioned in U.S. Pat. No. 4,192,921; U.S. Pat. No. 4,246,386; and U.S. Pat. No. 4,283,499—each of which is incorporated in its entirety. The free-radical initiators are employed in amounts sufficient to induce polymerization of the monomers in a particular monomer mixture. The amount will vary as those skilled in the art can appreciate and will depend generally on the type of initiators employed, as well as the type and proportion of monomers being polymerized. Generally, an amount of from about 0.02 to about 2 weight percent is adequate, based on total weight of the monomer mixture.

The first monomer mixture used to prepare the seed particles is advantageously suspended within an agitated suspending medium comprising a liquid that is substantially immiscible with the monomers, (e.g. preferably water). Generally, the suspending medium is employed in an amount from about 35 to about 70 and preferably from about 40 to about 55 weight percent based on total weight of the monomer mixture and suspending medium. Various suspending agents are conventionally employed to assist with maintaining a relatively uniform suspension of monomer droplets within the suspending medium and prevention of bead agglomeration. Illustrative suspending agents are gelatin, polyvinyl alcohol, magnesium hydroxide, hydroxyethylcellulose, methylhydroxyethylcellulose methylcellulose, and carboxymethyl methylcellulose. Other suitable suspending agents are disclosed in U.S. Pat. No. 4,419,245. The amount of suspending agent used can vary widely depending on the monomers and suspending agents employed. Latex inhibitors such as sodium dichromate may be used to minimize latex formation.

The seed particles may be of any convenient size. In general, the seed particles desirably have a volume average particle diameter of from about 75 to about 1000 microns, preferably from about 150 to about 800 microns, and more preferably from about 200 to about 600 microns. The distribution of the particle diameters may be Gaussian or uniform (e.g. at least 90 volume percent of the particles have a particle diameter from about 0.9 to about 1.1 times the volume average particle diameter).

As previously described, polymer particles may be prepared by providing a plurality of the seed particles and thereafter, adding a second monomer mixture such that the mixture is imbibed by the seed particles and polymerization is conducted therein. This step is preferably conducted as a batch-seeded process or as an in situ batch-seeded process, as described below. The second monomer mixture may also be added intermittently or continuously under polymerizing conditions, such as described in U.S. Pat. No. 4,564,644.

In the so-called "batch-seeded" process, seed particles comprising from about 10 to about 50 weight percent of the polymer are preferably suspended within a continuous suspending medium. A second monomer mixture containing a free radical initiator is then added to the suspended seed particles, imbibed thereby, and then polymerized. Although less preferred, the seed particles can be imbibed with the second monomer mixture prior to being suspended in the continuous suspending medium. The second monomer mixture may be added in one amount or in stages. The second monomer mixture is preferably imbibed by the seed particles under conditions such that substantially no polymerization occurs until the mixture is substantially fully imbibed by the seed particles. The time required to substantially imbibe the monomers will vary depending on the polymer seed composition and the monomers imbibed therein. However, the extent of imbibition can generally be determined by microscopic examination of the seed particles, or suspending media, seed particles and monomer droplets. The second monomer mixture desirably contains from about 0.5 to about 25 molar percent, preferably from about 2 to about 17 molar percent and more preferably 2.5 to about 8.5 molar percent of crosslinking monomer based on total weight of monomers in the second monomer mixture with the balance comprising a monovinylidene monomer; wherein the selection of crosslinking monomer and monovinylidene monomer are the same as those described above with reference to the preparation of the first monomer mixture, (i.e. seed preparation). As with the seed preparation, the preferred monovinylidene monomer includes styrene and/or a substituted styrene. In a preferred embodiment, the second polymer component (i.e. second monomer mixture, or "imbibed" polymer component) has a styrenic content greater than 50 molar percent, and more preferably at least 75 molar percent (based upon the total molar content of the second monomer mixture). In a preferred embodiment, the second polymer component is derived from polymerization of a second monomer mixture comprising at least 75 molar percent of styrene (and/or substituted styrene such as ethylvinylbenzene) and from about 1 to 20 molar percent divinylbenzene.

In an in-situ batch-seeded process, seed particles comprising from about 5 to about 80 weight percent of the IPN polymer product are initially formed by suspension polymerization of the first monomer mixture. The seed particles can have a free-radical source therein as previously described, which is capable of initiating further polymerization. Optionally, a polymerization initiator can be added with the second monomer mixture where the seed particles do not contain an adequate free radical source or where additional initiator is desired. In this embodiment, seed preparation and subsequent polymerization stages are conducted in-situ within a single reactor. A second monomer mixture is then added to the suspended seed particles, imbibed thereby, and polymerized. The second monomer mixture may be added under polymerizing conditions, but alternatively may be added to the suspending medium under conditions such that substantially no polymerization occurs until the mixture is substantially fully imbibed by the seed particles. The composition of the second monomer mixture preferably corresponds to the description previously given for the batch-seeded embodiment.

Conditions employed to polymerize ethylenically unsaturated monomers are well known in the art. Generally, the monomers are maintained at a temperature of from about 50 to 150° C. for a time sufficient to obtain a desired degree of conversion. Typically, an intermediate temperature of from about 60 to 85° C. is maintained until conversion of monomer to polymer is substantially complete and thereafter the temperature is increased to complete the reaction. The resulting porous polymer particles may be recovered from the suspending medium by conventional methods.

As previously described, the vinyl aromatic polymers are preferably prepared by suspension polymerization of a finely divided organic phase comprising monovinylidene monomers such as styrene, crosslinking monomers such as divinylbenzene, a free-radical initiator and, optionally, a phase-separating diluent. While the crosslinked polymer may be macroporous or gel-type, gel-type polymers are preferred. The terms "gel-type" and "macroporous" are well-known in the art and generally describe the nature of the polymer particle porosity. The term "macroporous" as commonly used in the art means that the polymer has both macropores and mesopores. The terms "microporous," "gellular," "gel" and "gel-type" are synonyms that describe polymer particles having pore sizes less than about 20 Angstroms (Å), while macroporous polymer particles have both mesopores of from about 20 Å to about 500 Å and macropores of greater than about 500 Å. Gel-type and macroporous polymer particles, as well as their preparation are further described in U.S. Pat. No. 4,256,840 and U.S. Pat. No. 5,244,926—the entire contents of which are incorporated herein by reference.

By way of convention, the polymer components of the vinyl aromatic polymers have been described in terms of the monomer content from which they are derived. With respect to the polymers described, the monomer content serves as an accurate proxy for the resulting polymer—including both content and ratios. That is, substantially all the monomer constituents polymerize with no substantive change in ratio. Thus, the reference to the styrenic content of a polymer component will be understood to describe the molar ratio of styrene and/or substituted styrene within the monomer mixture from which the polymer component is derived.

The finished polymer particles preferably have a bead structure with a median particle diameter from 300 to 800 microns. The crosslinked polymer particles may have a Gaussian particle size distribution or a relatively uniform particle size distribution, i.e. "monodisperse" that is, at least 90 volume percent of the beads have a particle diameter from about 0.9 to about 1.1 times the volume average particle diameter.

The specific means and conditions for chloromethylating vinyl aromatic polymers are not particularly limited and many applicable techniques are documented in the literature, as illustrated by: G. Jones, "Chloromethylation of Polystyrene," Industrial and Engineering Chemistry, Vol. 44, No. 1, pgs. 2686-2692, (November 1952), along with US 2008/0289949 and U.S. Pat. No. 6,756,462—both of which are incorporated herein in their entirety. Chloromethylation is typically conducted by combining the polymer with a chloromethylation reagent in the presence of a catalyst at a temperature of from about 15 to 100° C., preferably 35 to 70° C. for about 1 to 8 hours. A preferred chloromethylation reagent is chloromethyl methyl ether (CMME); however, other reagents may be used including CMME-forming reactants such as the combination of formaldehyde, methanol and hydrogen chloride or chlorosulfonic acid (as described in US 2004/0256597), or hydrogen chloride with methylated formalin. The chloromethylating reagent is typically combined with the polymer in an amount of from about 0.5 to 20, preferably about 1.5 to 8 mole of CMME per mole of polymer. While less preferred, other chloromethylation reagents may be used including but not limited to: bis-chloromethyl ether (BCME), BCME-forming reactants such as formaldehyde and hydrogen chloride, and long chain alkyl chloromethyl ethers as described in U.S. Pat. No. 4,568,700.

Catalyst useful for conducting chloromethylation reactions are well known and are often referred to in the art as "Lewis acid" or "Friedel-Crafts" catalyst. Nonlimiting examples include: zinc chloride, zinc oxide, ferric chloride, ferric oxide, tin chloride, tin oxide, titanium chloride, zirconium chloride, aluminum chloride and sulfuric acid along with combinations thereof. Halogens other than chloride may also be used in the preceding examples. A preferred catalyst is ferric chloride. The catalyst is typically used in an amount corresponding to about 0.01 to 0.2, preferably from about 0.02 to 0.1 mole catalyst per mole of polymer repeating unit. Catalyst may be used in combination with optional catalyst adjuncts such as calcium chloride and activating agents such as silicon tetrachloride. More than one catalyst may be used to achieve the desired chloromethylation reaction profile.

Solvents and/or swelling agents may also be used in the chloromethylation reaction. Examples of suitable solvents including but are not limited to one or more of: an aliphatic hydrocarbon halides such as ethylene dichloride, dichloropropane, dichloromethane, chloroform, diethyl ether, dipropyl ether, dibutyl ether and diisoamyl ether. When CMME is used as the chloromethylation agent, such solvents and/or swelling agents are often not necessary.

The chloromethylation of an aromatic vinyl polymer with chloromethylmethylether (CMME) to produce a chloromethylated vinyl aromatic polymer (i.e. benzyl chloride group located at the meta, ortho or para position) is represented below in Reaction 5.

Reaction 5: Chloromethylation reaction with CMME

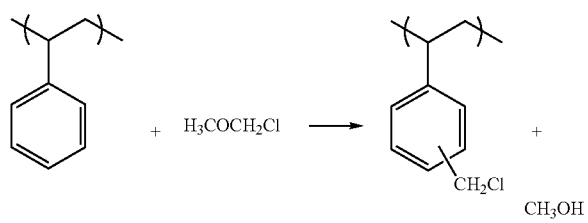

The conversion to the chloromethylated product is preferably at least 40%, more preferably at least 70% and still more preferably at least 80%.

The invention includes the reaction product of the subject amination, i.e. a vinyl aromatic polymer including a quaternary ammonium functionality comprising a nitrogen atom bonded to a benzyl carbon of the polymer and three alkyl or alkoxy groups. By way of illustration, Formula 3 provides a structural formula of a repeating unit of vinyl aromatic polymer including a quaternary ammonium functionality.

Formula 3:

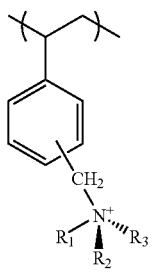

wherein the benzyl carbon is located at the meta, ortho or para position (typically including a combination of species but with predominantly para substitution) of the aromatic ring; and wherein $R_1$, $R_2$ and $R_3$ are the same as previously described with respect to Formula 1. Such polymers are suitable as ion exchange resins.

EXAMPLES

Example 1

Seventy (70) parts of a styrene-divinylbenzene (3.7% divinylbenzene), gel-type copolymer was prepared via suspension polymerization and subsequently chloromethylated by reaction with CMME in a manner described above. The chloromethylation conversion (i.e. as illustration in Reaction 5) was approximately 78 mole %. The chloromethylated copolymer was then washed to remove residuals including CMME and transferred to a separate reactor equipped with an agitator. The free liquid was removed and 320 parts of an alcohol-based solvent comprising methanol, methylal and water was added to the reactor. 0.9 parts of NaOH (as a 20 wt % solution) was then added to the reactor to destroy any residual by-product HCl remaining from the chloromethylation reaction. After agitation and equilibration, the solvent comprised approximately: 63 wt % methanol, 29 wt % methylal and 8 wt % water. 77 parts of tri-n-butyl amine was then added to the reactor. The reactor mixture heated to approximately 80° C. and maintained for approximately 7 hours. During the amination, the pH of the reaction mixture was adjusted by adding doses of caustic (NaOH as a 20 wt % solution) according to the protocol set forth in Table 1-A. pH values were determined based upon samples taken of the reaction mixture. Samples were taken approximately 10 to 40 minutes after each addition of caustic. FIG. 1 is a graph showing the pH and total caustic added to the reaction mixture as a function of the reaction time period.

After amination, the copolymer was washed with a combination of water and acid to produce an ammonium (tri-n-butyl amine groups) functionalized anion exchange resin. The properties of the anion exchange resin were measured and dry weight capacity and conversion were calculated. A small potion of the anion exchange resin was placed in a 25 wt % solution of trimethyl amine (TMA) overnight. This converted any residual benzyl chloride groups to TMA groups. The re-aminated resin was separated from the trimethyl amine and treated with a combination of washes (water/hydrochloric acid/water). The properties of the resin were measured and the mole % residual benzyl chloride groups were calculated. The remaining groups were assumed to be converted to methoxy groups. The results of the calculations are provided in Table 1-B.

TABLE 1-A

| Minutes | pH | Action taken |
| --- | --- | --- |
| 0 | — | Sample reaction mixture and determine pH |
| 0-180 | <9.3 | add 1.2 parts NaOH (6 parts 20 wt % NaOH actual), then resample and determine pH |
| 220-420 | <9.3 | add 0.6 parts NaOH (3 parts 20 wt % actual), then resample and determine pH |
| 0-420 | >9.6 | wait 30 minutes & resample and determine pH |

TABLE 1-B

| | Value |
| --- | --- |
| Resin Properties after amination with tri-n-butyl amine | |
| Water Retention Capacity | 46.2% |
| Wet Volume Capacity | 0.72 meq/ml |
| Bulk Density | 0.674 g/cc |
| Dry Weight Capacity | 1.97 meq/g |
| Mole % Amine Groups | 56 |
| Resin Properties after subsequent amination with TMA | |
| Water Retention Capacity | 47.9% |
| Wet Volume Capacity | 0.72 meq/ml |
| Bulk Density | 0.659 g/cc |
| Dry Weight Capacity | 2.10 meq/g |
| Mole % Residual Benzyl Chloride Groups | 4 |
| Mole % Methoxy Groups by Difference | 40 |

Example 2

An amination reaction was conducted in a manner similar to that as described in Example 1; however, the pH of the reaction mixture was not maintained via multiple additions of caustic throughout the reaction time period; and as a consequence, the reaction mixture became acidic. Two, 2 ml samples of the resulting reaction mixture were removed and titrated by adding each sample to 200 ml of water. The pH of the resulting solutions was approximately 3.2. 2 ml of N/1 caustic (NaOH) was then added to each solution. The pH of the resulting solutions was approximately 11.6. The solutions were each titrated with N/10 HCl. The titration data for each sample is provided below in Table 2 and plotted in FIG. 2. As shown by the titration data, the major portion of tri-n-butyl amine is in its free base form in a pH range of approximately 8.5 to 11.5.

TABLE 2

| Comment | 1st Titration | | 2nd Titration | |
|---|---|---|---|---|
| | N/10 HCl ml | pH | N/10 HCl ml | pH |
| Diluted 2 ml into 200 ml | 0 | 3.19 | 0 | 3.21 |
| H₂O + 2 ml N/1 NaOH | 0 | 11.59 | 0 | 11.58 |
| | 0 | 11.59 | 0 | 11.58 |
| | 1.13 | 11.56 | 5.62 | 11.22 |
| | 2.1 | 11.51 | 6.22 | 11.15 |
| | 3.1 | 11.44 | 6.85 | 11.07 |
| | 4 | 11.39 | 7.33 | 10.99 |
| | 4.58 | 11.33 | 7.92 | 10.87 |
| | 5.5 | 11.25 | 8.37 | 10.75 |
| | 5.98 | 11.19 | 8.8 | 10.62 |
| | 6.5 | 11.12 | 9.12 | 10.51 |
| | 7.22 | 11 | 9.4 | 10.39 |
| | 8.03 | 10.84 | 9.8 | 10.21 |
| | 8.52 | 10.7 | 10.13 | 10.07 |
| | 9.23 | 10.43 | 10.43 | 9.96 |
| | 9.63 | 10.25 | 10.68 | 9.89 |
| | 10.08 | 10.06 | 11.13 | 9.77 |
| | 10.42 | 9.93 | 11.51 | 9.70 |
| | 10.91 | 9.78 | 11.93 | 9.62 |
| | 11.32 | 9.67 | 12.43 | 9.54 |
| | 11.82 | 9.57 | 12.80 | 9.50 |
| | 12.44 | 9.45 | 13.08 | 9.46 |
| | 13 | 9.37 | 13.50 | 9.41 |
| | 13.3 | 9.33 | 13.98 | 9.36 |
| | 13.43 | 9.32 | 14.32 | 9.33 |
| | 13.68 | 9.26 | 14.53 | 9.30 |
| | 14.07 | 9.16 | 14.92 | 9.27 |
| | 14.51 | 9.08 | 15.42 | 9.22 |
| | 14.8 | 8.99 | 15.93 | 9.16 |
| | 15 | 8.88 | 16.18 | 9.12 |
| | 15.62 | 6.18 | 16.38 | 9.07 |
| | 15.89 | 5.72 | 16.80 | 8.94 |
| | 16.18 | 5.31 | 17.00 | 8.84 |
| | 16.58 | 4.78 | 17.19 | 8.75 |
| | 17.16 | 4.11 | 17.60 | 5.63 |
| | 18.02 | 3.68 | 18.00 | 4.18 |
| | 19.02 | 3.3 | 18.60 | 3.72 |
| | 19.8 | 3.04 | 19.19 | 3.41 |
| | | | 19.80 | 3.18 |

While principles of the invention are amenable to various modifications and alternatives forms, particular species have been described by way of examples and detailed description. It should be understood that the intent of this description is not to limit the invention to the particular embodiments described, but rather to cover all modifications, equivalents, and alternatives falling within the spirit and scope of the disclosure. Many embodiments of the invention have been described and in some instances certain embodiments, selections, ranges, constituents, or other features have been characterized as being "preferred." Characterizations of "preferred" features should in no way be interpreted as deeming such features as being required, essential or critical to the invention. It will be understood that certain features and subcombinations are of utility and may be employed without reference to other features and sub-combinations. References to ranges of numerical values expressly include the end points of such ranges. It will be appreciated that the vinyl aromatic polymers described herein may be further functionalized beyond the amination reaction described herein, such as also being aminated with amine species other than those described in connection with Formula 1.

The invention claimed is:

1. A method of conducting an amination reaction by:
i) combining a tertiary amine and a vinyl aromatic polymer comprising benzyl chloride groups in a ratio of less than 1.5 mole of tertiary amine per mole of benzyl chloride group of the vinyl aromatic polymer within an alcohol-based solvent to form a reaction mixture, wherein the tertiary amine is represented by the formula:

wherein $R_1$, $R_2$ and $R_3$ are each independently selected from: alkyl and alkoxy groups; with the proviso that the total number of carbon atoms for $R_1$, $R_2$ and $R_3$ is at least 7;
ii) conducting an amination reaction for a reaction time period of at least 2 hours; and
iii) maintaining the reaction mixture at a temperature of at least 50° C. and a pH of at least 7 for at least half of the reaction time period by adding a base selected from at least one of: sodium hydroxide, sodium carbonate, calcium hydroxide, calcium oxide and potassium hydroxide.

2. The method of claim 1 wherein the reaction mixture is maintained within a pH range of from 8.5 to 11.5 for at least half of the reaction time period by the addition of a base to the reaction mixture, wherein the base is selected from at least one of: sodium hydroxide, sodium carbonate, calcium hydroxide, calcium oxide and potassium hydroxide.

3. The method of claim 1 wherein a base is repeatedly added to the reaction mixture during the reaction time period and wherein the base is selected from at least one of: sodium hydroxide, sodium carbonate, calcium hydroxide, calcium oxide and potassium hydroxide.

4. The method of claim 1 wherein the alcohol-based solvent comprises methanol.

5. The method of claim 1 wherein the tertiary amine is selected from at least one of: tripropyl amine, tributyl amine, tripentyl amine and trihexyl amine.

6. The method of claim 1 wherein the vinyl aromatic polymer comprising benzyl chloride groups comprises repeating units represented by the formula:

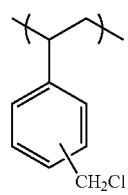

wherein the benzyl chloride group is located at the meta, ortho or para position.

7. The method of claim 1 wherein a reaction product of the amination reaction comprises a vinyl aromatic polymer comprising repeating units represented by the formula:

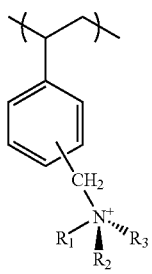

wherein $R_1$, $R_2$ and $R_3$ are each independently selected from: alkyl and alkoxy groups; with the proviso that the total number of carbon atoms for $R_1$, $R_2$ and $R_3$ is at least 7.

8. The method of claim 1 wherein a reaction product of the amination reaction comprises a vinyl aromatic polymer comprising repeating units represented by the formula:

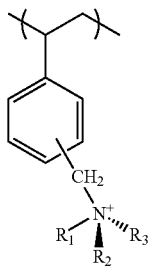

wherein $R_1$, $R_2$ and $R_3$ are each independently selected from alkyl groups comprising from 1 to 8 carbon atoms with the proviso that the total number of carbon atoms for $R_1$, $R_2$ and $R_3$ is at least 8.

9. The method of claim 1 wherein the reaction time period is at least 6 hours.

10. The method of claim 1 wherein the alcohol-based solvent comprises at least: 30 weight percent methanol, 20 weight percent methylal and 10 weight percent water.

11. The method of claim 1 wherein the step of combining a tertiary amine and a vinyl aromatic polymer further comprises combining the reactants in a ratio of less than or equal to one mole of tertiary amine per mole of benzyl chloride group of the vinyl aromatic polymer.

12. A method of claim 1 comprising:
i) a tertiary amine represented by the formula:

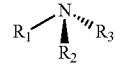

wherein $R_1$, $R_2$ and $R_3$ are each independently selected from: alkyl groups having from 1 to 8 carbon atoms and alkyoxy groups having from 2 to 8 carbon atoms, with the proviso that the total number of carbon atoms for $R_1$, $R_2$ and $R_3$ is at least 8; and a vinyl aromatic, gel-type polymer which comprises repeating units represented by the formula:

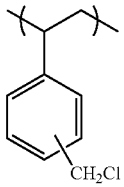

wherein the benzyl chloride group is located at the meta, ortho or para position;
in a ratio of from 0.5 to 1.2 mole of tertiary amine per mole of benzyl chloride group of the polymer, within an alcohol-based solvent comprising at least: 30 weight percent methanol, 20 weight percent methylal and 10 weight percent water, to form a reaction mixture;
ii) conducting an amination reaction for a reaction time period of from 5 to 10 hours; and
iii) maintaining the reaction mixture at a temperature of from 65 to 85° C. and a pH of from 8.5 to 11.5 for at least half of the reaction time period.

* * * * *